(12) United States Patent
Kurata (10) Patent No.: US 7,640,645 B2
(45) Date of Patent: Jan. 5, 2010

(54) AUTOMATIC WORK-PIECE SETTING METHOD

(75) Inventor: Mitsutoshi Kurata, Aichi (JP)

(73) Assignee: Nisshinbo Holdings, Inc., Tokyo (JP)

( * ) Notice: Subject to any disclaimer, the term of this patent is extended or adjusted under 35 U.S.C. 154(b) by 178 days.

(21) Appl. No.: 11/463,235

(22) Filed: Aug. 8, 2006

(65) Prior Publication Data

US 2007/0028439 A1 Feb. 8, 2007

(30) Foreign Application Priority Data

Aug. 8, 2005 (JP) ............................. 2005-230103

(51) Int. Cl.
*B21D 19/00* (2006.01)
*B21D 39/03* (2006.01)
*B23P 19/00* (2006.01)

(52) U.S. Cl. .................. 29/430; 29/429; 29/407.09; 29/426.1; 29/822; 29/824; 134/76

(58) Field of Classification Search .................. 29/430, 29/426.1, 428, 458, 407.09, 407.1, 527.2, 29/783, 791, 73.1, 429, 822, 823, 824; 188/206 R, 188/250 A, 250 B, 250 G, 250 F, 161; 118/426; 134/70, 76

See application file for complete search history.

(56) References Cited

U.S. PATENT DOCUMENTS

| 2,082,052 | A | * | 6/1937 | Frost et al. ............. 192/150 |
| 2,106,706 | A | * | 2/1938 | Gordon .................. 118/73 |
| 2,577,534 | A | * | 12/1951 | Lowe .................. 409/165 |
| 2,943,347 | A | * | 7/1960 | Archibald ............... 425/339 |
| 3,182,810 | A | * | 5/1965 | Fahrenwald ............. 211/118 |
| 4,966,549 | A | * | 10/1990 | Ohdate ................. 432/253 |
| 5,043,301 | A | * | 8/1991 | Ohdate ................. 438/795 |
| 5,109,264 | A | * | 4/1992 | Ohdate ................. 257/618 |
| 5,531,379 | A | * | 7/1996 | Hammett ............... 238/1 |
| 5,740,960 | A | * | 4/1998 | Hammett ............... 238/1 |
| 2007/0101567 | A1 | * | 5/2007 | Suda et al. .............. 29/430 |

\* cited by examiner

*Primary Examiner*—Essama Omgba
(74) *Attorney, Agent, or Firm*—Apex Juris, pllc; Tracy M Heims

(57) ABSTRACT

A method for automation of conventional manual operation of setting the work-pieces on the hanger (H) for transporting the work-pieces, which moves such as in the surface treatment equipment (300), so as to provide the labor and power saving effect, to improve the efficiency on the operation, and to further improve the quality of the surface of the work-piece after treatment, comprises the process to separate and align plural work-pieces which are joined and aligned; the process to support the skewer-shaped supporting member (K) supporting plural separated and aligned work-pieces while maintaining the separated and aligned configuration; and the process to hang the skewer-shaped supporting member (K) supporting the work-pieces in the separated and aligned configuration on the hanger (H).

12 Claims, 7 Drawing Sheets

AUTOMATIC WORK-PIECE SETTING METHOD

BACKGROUND OF THE INTENTION

1. Field of the Invention

The present invention relates to manufacturing processes. Particularly, the present invention relates to a method of setting work-piece while maintaining a separated and aligned configuration of the work-pieces.

2. Description of the Related Arts

Figure 1:
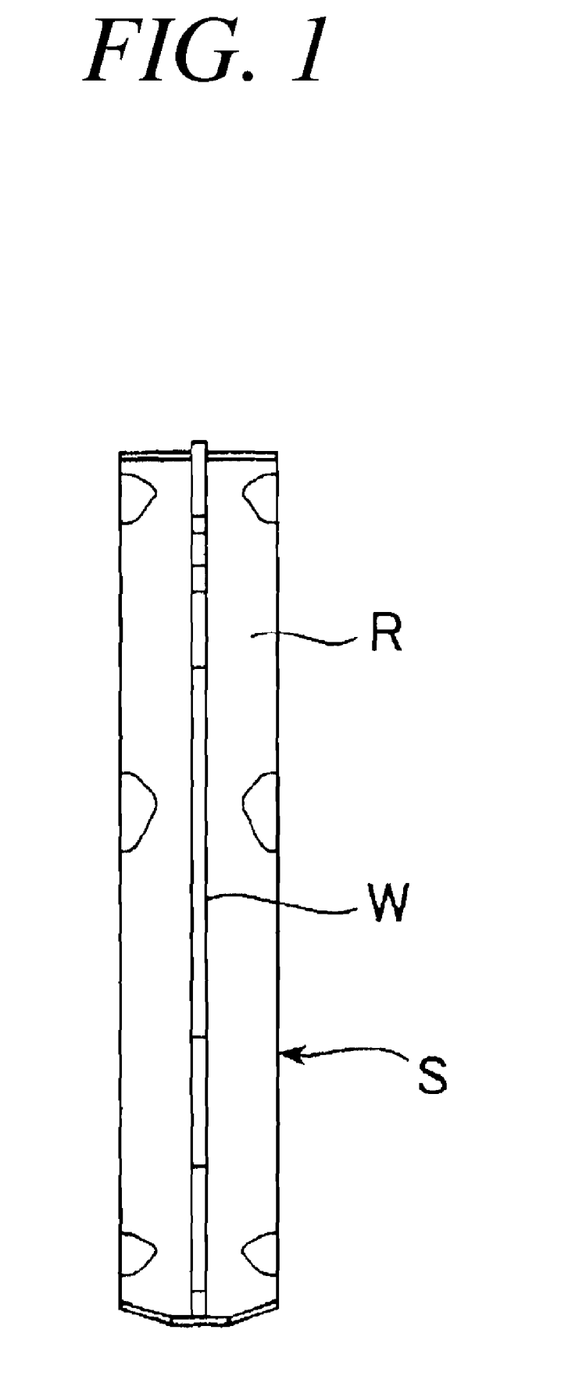
FIG. 1 is a front view of the shoe body as one example of the work-piece to which the present invention is applied.
Figure 2:
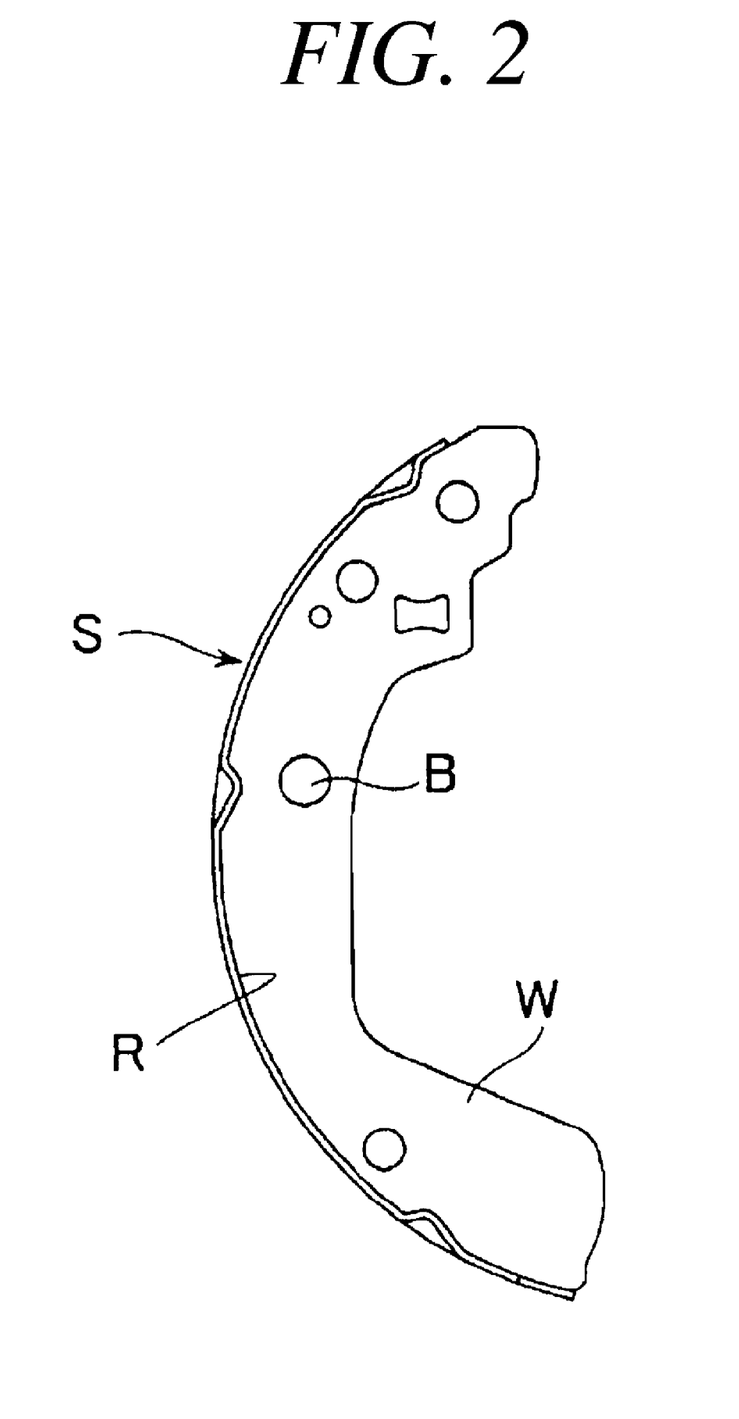
FIG. 2 is a side view of the shoe body of FIG. 1.

As a manufacturing process, where brake shoes of automotive drum brakes are the work-pieces, there are a surface treatment process of a shoe body Shown in FIGS. 1 and 2 as an example and a fixing process for fixing a lining on the shoe body continuously after completion of the surface treatment. The surface treatment process consists of washing, degreasing, drying and coating. Ordinarily in this surface treatment process, each shoe body is individually hung and supported on the hanger, and a processing is performed in turn by moving the shoe bodies consecutively through the inside of the surface treatment equipment. A conventional operation of hanging the shoe bodies on this hanger has been performed by a manual operation. In order to automate this operation, it is necessary to strive to eliminate any unfinished portion of the processing on the entire surface of the shoe body, thereby sufficiently considering how the shoe is best situated when hanging on the hanger; however, a method of automation with such consideration has not yet been proposed.

SUMMARY OF THE INVENTION

An object of the present invention is to provide a method of automation for the purposes of labor saving and improving the efficiency of the operation of setting the work-pieces on the hanger used for transporting the work-pieces inside of such as the surface treatment equipment that has conventionally been performed manually and further improving the quality of the surface of the work-piece after surface treatment.

The configuration of the automatic work-piece setting method according to the present invention to resolve the above-identified problems comprises steps of: separating and aligning plural work-pieces which have been joined and aligned, supporting the plural work-pieces, which have been separated and aligned at said separating and aligning step, with a skewer-shaped supporting member while maintaining the separated and aligned configuration of the plural work-pieces, and hanging the skewer-shaped supporting member, which has been supporting the work-pieces in the separated and aligned configuration at said supporting step, on the hanger so as to transport the plural work-pieces to a next manufacturing process, and the step of separating and aligning plural work-pieces comprises sub-steps of: feeding the plural work-pieces one by one, which have been joined and aligned, by actions of two shutters having a function of moving forward and backward, and aligning the work-pieces, which have been fed one by one at the feeding sub-step, into a predetermined number of pieces with a separating section having two mechanisms which relatively move forward and backward in an orthogonal direction.

In the above-method of the present invention, the work-pieces are shoe bodies of brake shoes for drum brakes, and the shoe bodies are transported to a surface treatment process with the hanger.

Also, in the method of the present invention, the work-piece has a hanging section at which to be hung on the skewer-shaped supporting member, and the supporting member has a receiving section which supports the hanging section of the work-piece. Here, the hanging section of the work-piece is a hanging hole, and the receiving section of the skewer-shaped supporting member is a concave portion. Also, one end of the skewer-shaped supporting member is fixed by a chuck when the supporting member freely penetrates the hanging holes of plural work-pieces.

It became clear that the present invention is not only able to achieve the aims of labor savings in operations and improvements in efficiency, but it can also make a great contribution to stock reduction and rationalization of goods distribution because the present invention makes it possible to automate the operation of setting the work-piece on the hanger in the manufacturing processes such as the surface treatment process that was conventionally carried out manually.

Furthermore, automation that does not use any human hands is possible in setting of the work-pieces, thereby eliminating a possibility of making scratches and dents that can arise easily during setting the work-piece and improving a yield rate in comparison to hanging by manual operation.

Moreover, because no operator is necessarily directly touching the work-piece in the setting operation of the work-piece, sticking of skin oil or glove fiber to the surface of the work-piece is not concerns, and it is possible to improve the quality of the surface of the work-piece after the surface treatment.

Also, the present invention is applicable not only to automotive brake shoes but also to other types of work-pieces manufactured by manufacturing equipments having plural processes engaging one another on a production line.

BRIEF DESCRIPTION OF THE DRAWINGS

The above and other objects of the present invention will become readily apparent by reference to the following detailed description when considered in conjunction with the accompanying drawings wherein.

EMBODIMENTS OF THE INVENTION

Next, embodiments of the present invention will be explained taking an example of an automatic work-piece setting method for the shoe body of the automotive brake shoe with reference to the figures.

FIG. 1 is a front view of an example of the shoe body represented as the work-piece in the present invention; FIG. 2 is a left side view of the shoe body of FIG. 1; and FIG. 3 is a front view of the skewer-shaped supporting member of the present invention.

Figure 4:
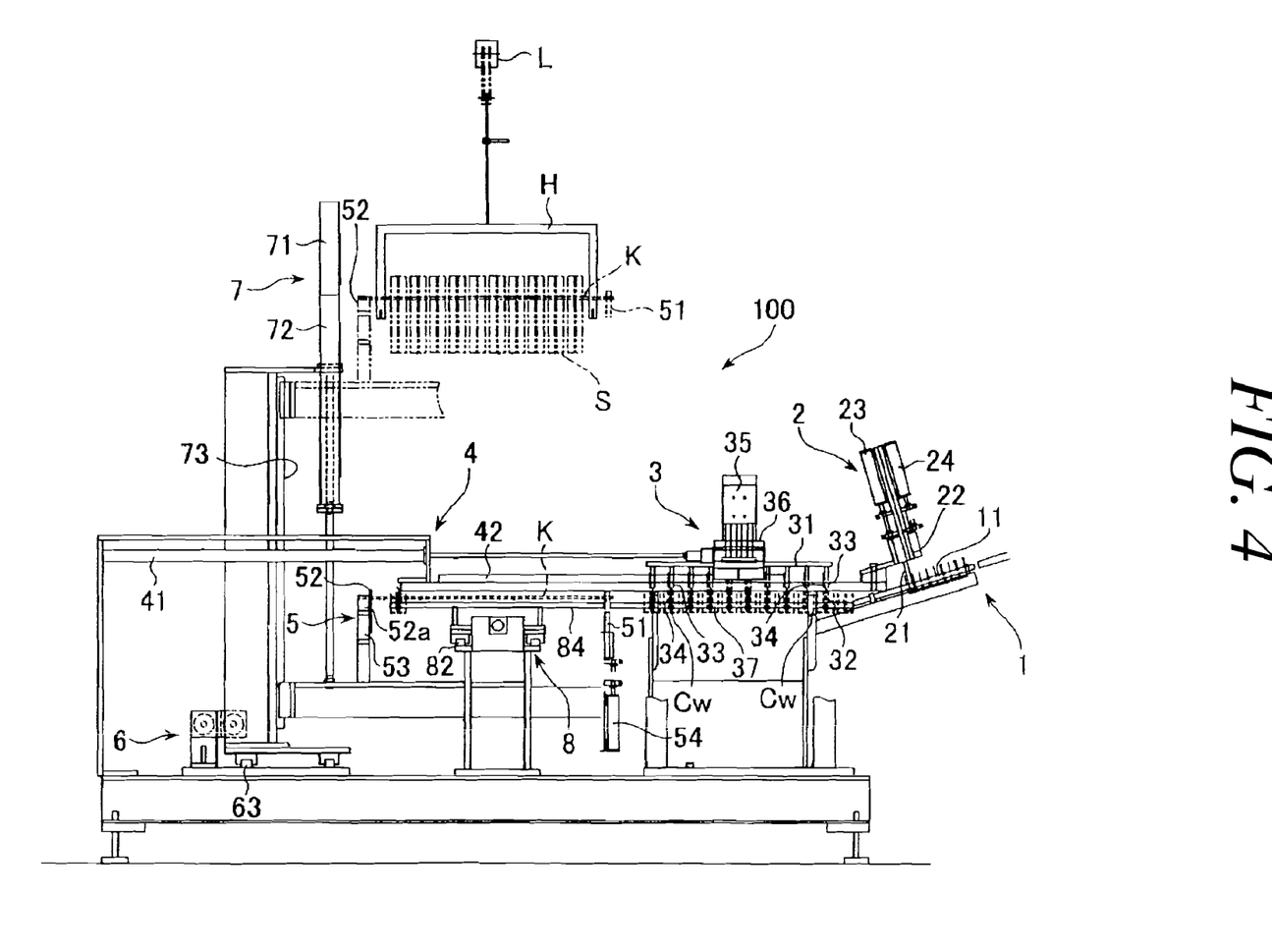
FIG. 4 is a front view of the shoe body automatic setting apparatus to which the present invention is applied.
Figure 5:
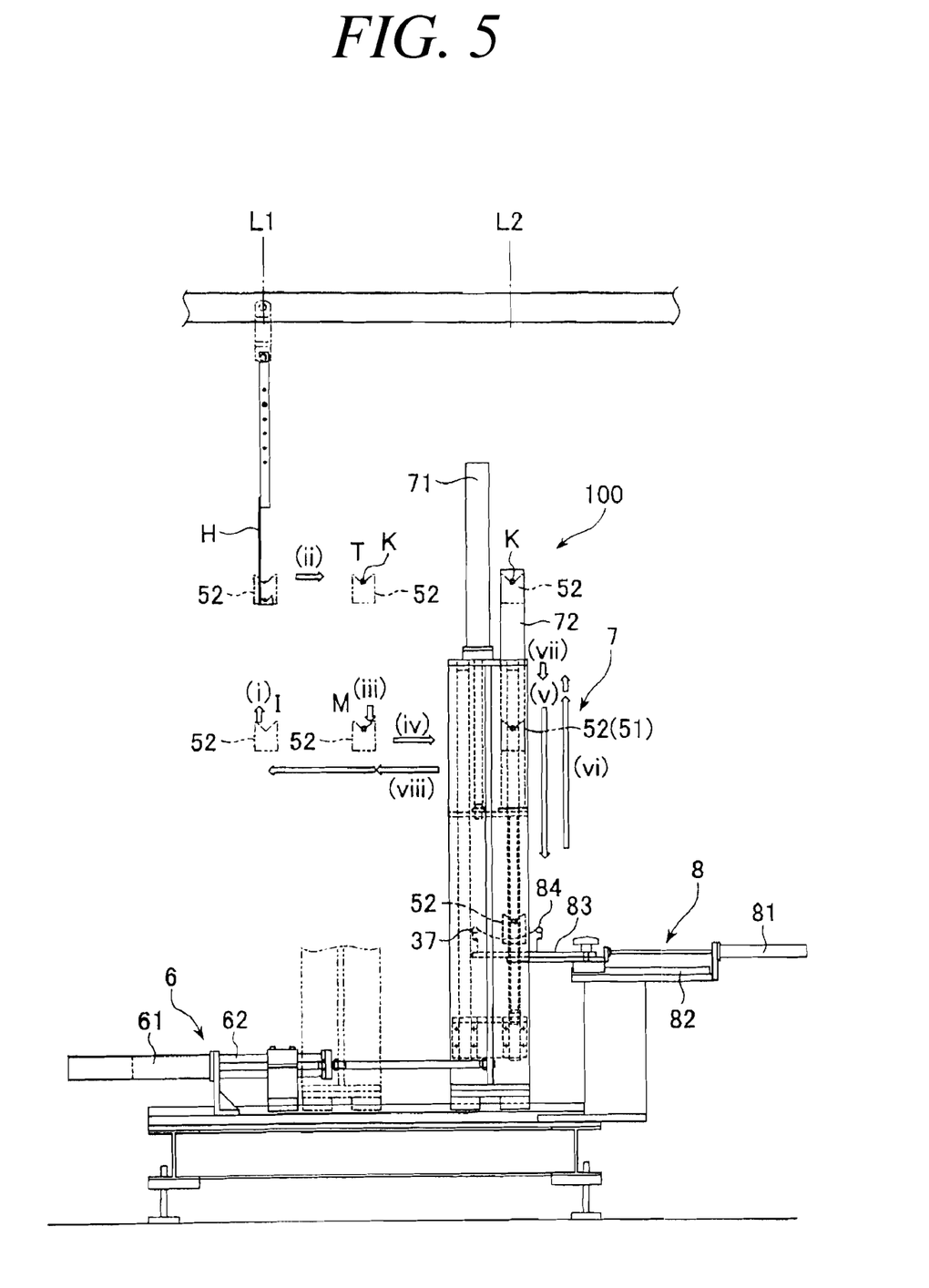
FIG. 5 is a left-side view of the apparatus of FIG. 4.
Figure 6:
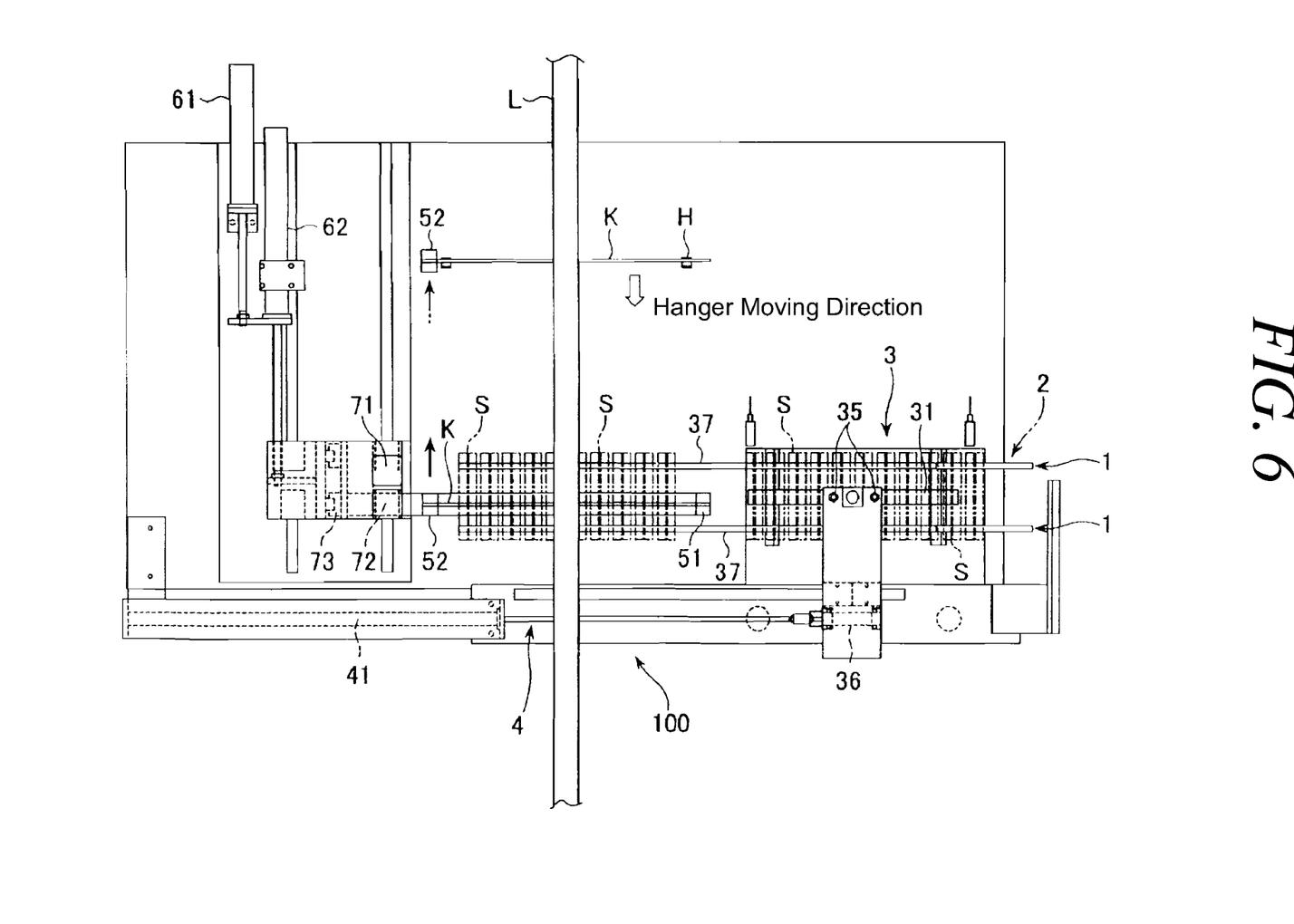
FIG. 6 is a plan view of the apparatus of FIG. 4.
Figure 7:
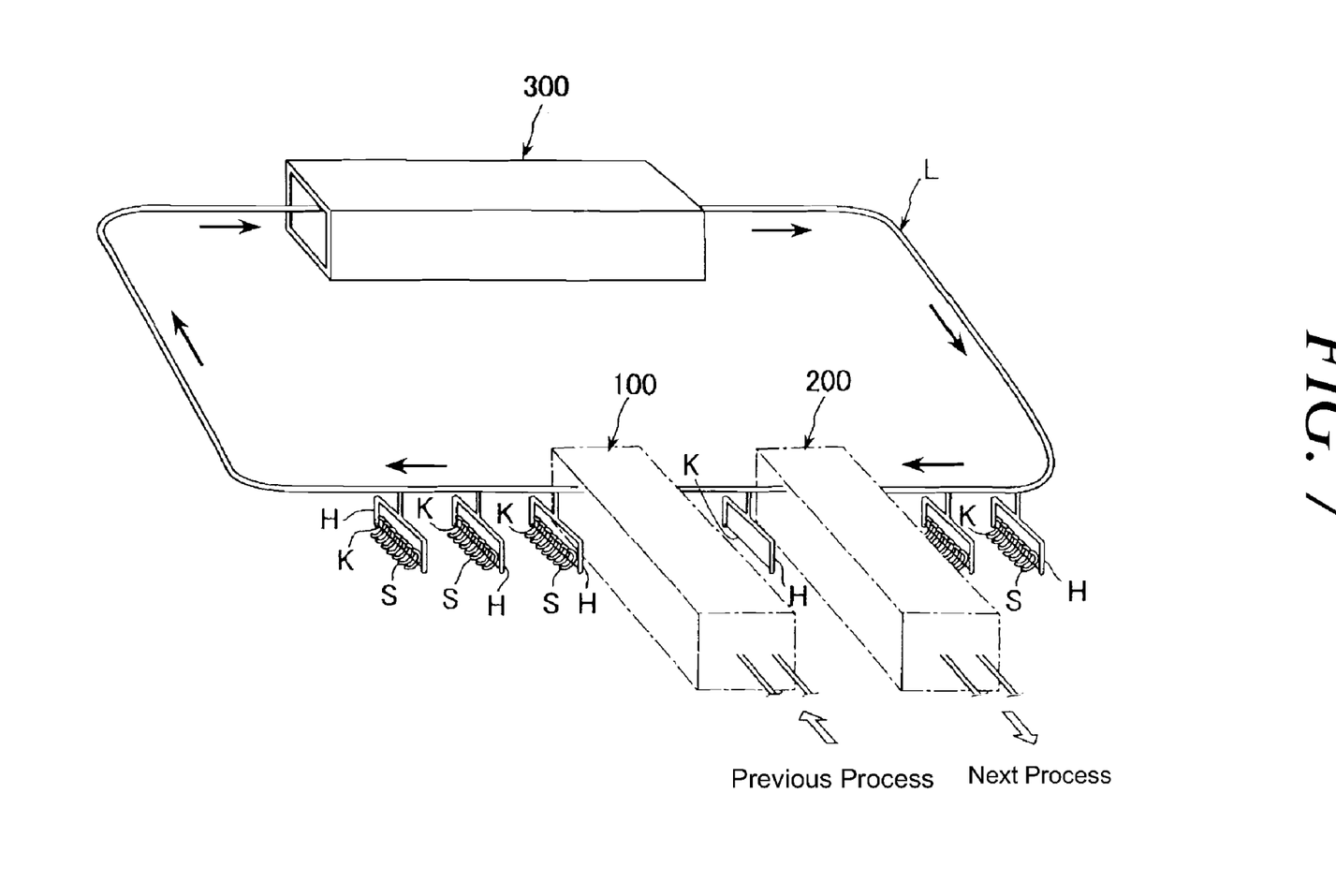
FIG. 7 is a schematic process explanatory view of the surface treatment process of the shoe bodies in the present invention.

FIG. 4 is a plan view illustrating the automatic shoe body Setting apparatus employed in the present invention; FIG. 5 is a left side view of the apparatus of FIG. 4; FIG. 6 is a plan view of the apparatus of FIG. 4; and FIG. 7 is a perspective process explanatory view of the surface treatment process of the shoe body employed in the present invention.

In FIGS. 1 and 2, as an example applied as the work-piece of the present invention, an embodiment of the shoe body of the brake shoe for the drum brake is illustrated in a plan view and a side view. A shoe body S, a shoe rim R, a shoe web W, and a hanging hole B, through which a skewer-shaped supporting member K used in the present invention as appeared in FIG. 3 penetrate and with which the supporting member K engage. Also, the present invention is not limited to use the hanging hole B and such as a notched groove which is not shown in the figures is also applicable as long as the workpiece can be hung and supported on the skewer-shaped supporting member K.

Figure 3:
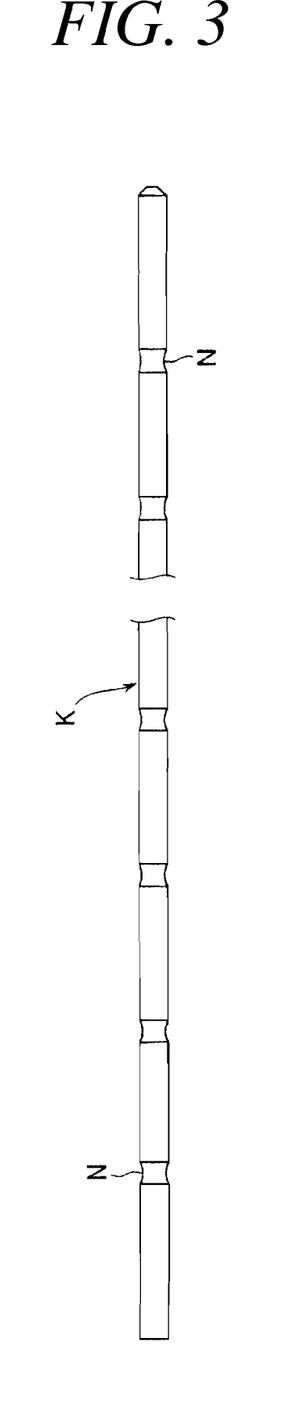
FIG. 3 is an enlarged front view of the skewer-shaped supporting member of the present invention.

FIG. 3 illustrates an example of the skewer-shaped supporting member K to be used in the method of the present invention. The supporting member K is a round bar processed to form grooves N in an arc-shaped cross-section on the side surface thereof with a predetermined pitch. In general, when surface-treating shoe bodies S for manufacture of the brake shoes, it is necessity for processing to be careful to the entire surface thereof. Thus, the grooves N are formed on the skewer-shaped supporting member K so as to have a structure which enables to arrange each shoe body S mutually separated. Also, the shape of the groove N may be any shape in cross-section as such as a rectangular shape formed according to the shape of the shoe body S instead of the arc-shape as shown in the illustrated example. Furthermore, the skewer-shaped supporting member K is made of steel materials; however, such as other metals or plastics may be substituted according to the contents of the process for supplying the shoe body S.

The present invention is, for example, applicable to the following embodiment. The embodiment is the automatic setting method to set the shoe bodies, which have been joined each other and aligned on the hanger and to transport the same to the surface treatment equipment at a next process.

FIGS. 4-6 are explanatory figures of shoe body-automatic setting apparatus which automatically sets the shoe bodies S as the work pieces on the hanger to be transported to the surface treatment equipment at the next process, wherein FIG. 4 is the front view of the apparatus; FIG. 5 is the left side view of FIG. 4; and FIG. 6 is the plan view of FIG. 4. FIG. 7 is the schematic process explanatory view of the surface treatment process of the shoe bodies according to the present invention, which is an explanatory view that schematically represents the layout of a shoe body-automatic setting apparatus 100, a shoe body-automatic taking-out apparatus 200, which moves in essentially the reverse order of the automatic setting apparatus 100, a surface treating equipment 300, and a rail L of a transporting line equipped with a plurality of hangers H. Because the automatic setting apparatus 100 illustrated in FIGS. 4-6 is configured with a stocker 1 for the shoe bodies S, a shutter 2, a separating section 3, a first traversing section 4, a supporting section 5 to support the skewer-shaped supporting member, a second traversing section 6, a lifter 7, and a brake shoe-auxiliary supporting section 8, the structure and function of each section will be explained next.

Step to Join and Align the Shoe Body S (Work-Pieces)

Stocker 1

The stocker 1 is a section to join and align the shoe bodies S. That is, the shoe bodies S supplied from the previous manufacturing process are joined and aligned on a shooter 11 having downward slope to be stocked thereon.

Step to Mutually Separate and Align Plural Shoe Bodies S (Work-Pieces) which have been Joined Each Other and Aligned.

Shutter 2

The shutter 2 is for the step to mutually separate and align plural shoe bodies which have been joined and aligned in cooperation with the later described separating section 3 and the brake shoe-auxiliary supporting section 8. The shutter 2 is arranged to be connected to the stocker 1 and has a function that feed one by one the shoe bodies S, which have been joined and aligned on the shooter 11 of the stocker 1 to the downstream side with two stoppers 21 and 22 each having a function to ascend and descend.

The stoppers 21 and 22 are arranged in tandem, and each has a mechanism to independently make a vertical movement by air cylinders 23 and 24 respectively. Furthermore, the stoppers 21 and 22 move orthogonally relative to a moving direction of the shoe body S.

First, while both stoppers 21 and 22 are descending, the stopper 22 abuts against the shoe web W of the shoe body S positioned at front so as to restrict the movement of the shoe bodies S. Here, if the stopper 22 ascends plural shoe bodies S which are joined and aligned entirety slide on the shooter 11 by their own weight, and the entire shoe bodies S are transported until the shoe web W of the shoe body S positioned at front abuts against the stopper 21. A distance of transporting is substantially same as a width of the shoe rim R of the shoe body S. That is, the stoppers 21 and 22 are apart from each other in tandem with a width of one brake shoe.

Next, after the stopper 22 descends again to restrict the movement of the shoe bodies S, if the stopper 21 ascends, the shoe body S positioned at front only slides on the shooter 11 by its own weight to reach an entry of the separating section 3. Furthermore, when the shooter 11 of the stocker 1 is horizontally arranged, although not shown in the figures, two stoppers may be used just like the structure of the above-describe example, a cylinder (not shown in the figures) may be provided for transporting one shoe body S separated by the stopper to the entry of the separating section 3, and the stocker 1 joins and aligns the shoe bodies S to transport the same on a conveyor driven such as with an electric motor.

Separating Section 3

The separating section 3 is for the step to mutually separate and align plural shoe bodies which have been joined each other and aligned in cooperation with the above described shutter 2 and the brake shoe-auxiliary supporting section 8. The separating section 3 is arranged to connect to the shutter 2 and has a function to align plural shoe bodies S in unit, which is fed one by one from the shutter 2, on a shoe-guiding rail 37 in a separated state. A separator 31, for temporarily holding the shoe web W of the respective shoe body S so as to separate and align plural shoe bodies S (for example, ten shoe bodies in this example), is designed to have two fork-shaped supporting members composed of two guide plates 33 and 34 are arranged to confirm with intervals of ten shoe bodies S. A clearance Cw is formed between the respective pair of guide plates 33 and 34 to sufficiently be capable of placing the shoe web W of the respective shoe body S therein. Furthermore, the shoe-guiding rail 37 may be structured to extend to reach the later described lifter 7. Also, in the case that the hanging hole B of the shoe web W is positioned around an end of the shoe body S instead of a central region thereof according to shapes of the shoe bodies S, in order to avoid the supporting section 5 for supporting the skewer-shaped supporting member K from interfering with the shoe-guiding rail when the supporting section 5 is lifting, the shoe-guiding rail 37 can be structured to be divided. In such a case, as shown in FIG. 5, a divided shoe-guiding rail 84 may be structured to be mounted on a bracket 83 movable along a linear guide 82 with a cylinder 81 of the brake shoe-auxiliary supporting section 8. After the shoe body S is supported by the skewer-shaped supporting member K, upon confirming that the supporting member K ascends to an appropriate distance at the lifter 7, if the cylinder 81 operates to move the divided shoe-guiding rail 84 backward, no interference occurs upon a pro-ascending operation of the lifter 7. In the following section, the structure of the shoe-guiding rail 37 extended to reach the lifter 7 will be explained.

Step to Support Plural Shoe Bodies S (Work-Pieces), while Maintaining the Separated and Aligned Configuration, with the Skewer-Shaped Supporting Member First Traversing Section 4

The first traversing section 4 is for the step to support plural shoe bodies S while maintaining separated and aligned configuration in cooperation with the later described supporting section 5 to support the skewer-shaped supporting member K. The first traversing section 4 has a function to freely penetrate the skewer-shaped supporting member K through the hanging holes B of the shoe webs W of shoe bodies S, which are separated and aligned to line up in a row by the above-described separator 31, all together to the left in FIG. 4 along a linear guide 42 by an air cylinder 41 for traversing.

Supporting Section 5

The supporting section 5 is for the step to support plural shoe bodies S while maintaining separated and aligned configuration in cooperation with the above described first traversing section 4 and has a function to support the skewer-shaped supporting member K to penetrate the same through the shoe bodies S, which is separated and aligned with the above-described separator 31. A V-block part is comprised of a first V-block 51 positioned at a separator 31 side and a second V-block 52 positioned at an opposite side of the separator 31, two V-blocks 51 and 52 support the skewer-shaped supporting member K at both ends thereof. The second V-block 52 comprises a chuck 52a which opens and closes with a cylinder 53 operated such as by pneumatic, and the chuck 52a offers single side support for the skewer-shaped supporting member K only at the opposite side of the separator 31. The first V-block 51 at the separator side is usually descending and ascends with a cylinder 54 only upon completing the operation of freely penetrating the hanging holes B of all shoe bodies S, which are separated and aligned as moving the shoe bodies S, thereby supporting both ends of the skewer-shaped supporting member K with two V-blocks 51 and 52.

Step to Hang Skewer-Shaped Supporting Member K Supporting Plural Shoe Bodies S (Work-Pieces)

Second Traversing Section 6

The second traversing section 6 is for the step to hang the skewer-shaped supporting member K supporting the shoe bodies S in the separated and aligned configuration in cooperation with the later described lifter 7. The second traversing section 6 has a function to make a horizontal movement of the lifter 7 with the supporting section 5 for supporting the skewer-shaped supporting member on a rail L of a transporting line for the hanger H in FIG. 5 along a linear guide 63 with air cylinders 61 and 62 between a first position L1 for receiving the emptied skewer-shaped supporting member K and a second position L2 for hanging the skewer-shaped supporting member K on the hanger H. The second traversing section 6 is horizontally positioned in an orthogonal direction relative to the shoe-guiding rail 37 and uses two cylinders 61 and 62 as exemplified in FIG. 6. Two cylinders 61 and 62 are used to provide an intermediate stop position T (as shown in FIG. 5) to avoid interference with the hanger H because the hanger H, when in the state where the emptied skewer-shaped supporting member K has been removed, is moving toward the second position L2 on the hanger transport line L as shown in FIG. 5. As installing such as a sensor to confirm the intermediate stop position T, one cylinder may enable to function the second traversing section 6.

Lifter 7

The lifter 7 is for the step to hang the skewer-shaped supporting member K supporting the shoe bodies S in the separated and aligned configuration in cooperation with the above described second traversing section 6. The lifter 7 has a function to move the supporting section 5 from the height, where the skewer-shaped supporting member K can freely penetrate through plural shoe bodies S, to the height, where skewer-shaped supporting member K is to be set on the hanger H (or the first position L1, where emptied skewer-shaped supporting member K is removed from the hanger H) along a longitudinal linear guide 73 with vertical air cylinders 71 and 72. As exemplified in FIG. 5, two cylinders 71 and 72 are used herein. Two cylinders 71 and 72 are used to provide an intermediate stop position M (as shown in FIG. 5) to avoid interference with the hanger H because the hanger H, when in the state where the emptied skewer-shaped supporting member K has been removed, is moving toward the second position L2 on the hanger transport line L as shown in FIG. 5. In this case as well, as installing such as a sensor to confirm the intermediate stop position M, one cylinder may enable to function as the lifter 7.

Although it is not shown in FIGS. 4-6 which describe the above-described embodiment, if a servo motor and a ball screw mechanism are used instead of the air cylinder 41 at the first traversing section 4 and the large quantity of guide plates of the separator 31 are changed to only one pair of the guide plates 33 and 34, the respective shoe body S separately and individually transported from the shutter 2 may be penetrated through the skewer-shaped supporting member K one after another. This structure can be applicable to a manufacturing line that involves in processing brake shoes with different shapes such as different widths. Also, if a driving method of the second traversing section 6 and the lifter 7 are changed to a method using a combination of servo motor, ball screw mechanism and numerical control system, other models of brake shoes with different positions of the hanging hole B of the shoe body S. In this case, it is preferable to pre-form grooves corresponding to other models of shoe bodies when dealing with the manufacturing line involving plural mixed type products.

The following section explains, as dividing into a first half and a second half of the series, an operation of setting the shoe bodies S, which are supplied from the previous process, on the hanger H transported to the next process, with the automatic setting apparatus 100 for the shoe body S, which is comprised of the respective members having the above-identified functions. The first half of the series begins with an operation of feeding one by one plural shoe bodies S, which have been joined and aligned with the stoppers 21 and 22 of the shutter 2, and is finished with an operation of aligning the plural shoe bodies S on the shoe-guiding rail 37 in the separated and aligned configuration with the separating section 3. The second half of the series begins with an operation of removing the skewer-shaped supporting member K from the hanger H, and is finished with an operation of hanging the skewer-shaped supporting member K, which has been supporting the shoe bodies S, on the hanger H.

Operation of the First Half of the Series

First, plural shoe bodies S, which are joined and aligned at the stocker 1, are fed one by one by moving the stoppers 21 and 22 of the shutter 2. Next, one fed shoe body S slides down on a downward slope of the shooter 11 by its own weight and moves onto the shoe-guiding rail 37 of the separating section 3 and stops by abutting against a stopper 32 at an end (a right side of FIG. 4) of the shoe-guiding rail 37. After confirming the passage of the shoe bodies S such as by sensors, the separator 31 ascends with a cylinder 35, the rod of a cylinder 36 moves forward under this condition, and the separator 31 descends at a position where the clearance Cw of the guide plates 33 and 34 is positioned above the shoe web W. The shoe web W of the respective shoe body S fits freely into the clearance Cw of the separator 31. Then, the rod of the cylinder 36 moves backward, and the first shoe body S is aligned on the shoe-guiding rail 37. In a continuous next operation, when the second or later shoe body S are fed one by one from the shutter 2 to be supplied to abut against the stopper 32 of the separator 31, the second or later shoe body S moves to align by following the same operation as stated above. As such, as the separator 31 repeats a cycle of ascending-moving forward (moving to the right)-descending-moving backward (moving to the left) multiple times by the operation of two cylinders 35 and 36, the step of separating and aligning plural shoe bodies S on the shoe-guiding rail 37 is completed.

Operation of the Second Half of the Series

The operations of the second half of the series begins with the operation of removing the skewer-shaped supporting member K from the hanger H and is finished with the operation of hanging the skewer-shaped supporting member K, which has been supporting the shoe body S, on the hanger H and are operated in parallel to the operation of the first half of the series as described above. The operations of the second half of the series will be explained as focusing on the explanation of FIG. 5. First, an initial operation position (I) is such that the horizontal position is located at the first position L1 on the rail of the hanger transporting line as shown in FIG. 5 and the vertical position is located at the intermediate stop position M. That is, the rods of the cylinders 61 and 62 in the second traversing section 6 are positioned back, the rod of the cylinder 71 in the lifter 7 is positioned front, and the rod of the cylinder 72 in the lifter 7 is positioned back. Under these conditions, the V-blocks 51 and 52 of the supporting section 5 to support the skewer-shaped supporting member K operates in the following order (i)-(viii) when the hanger H with the emptied skewer-shaped supporting member K is positioned straight above the V-blocks 51 and 52. In the operation (i), the lifter 7 moves up to an upper end by moving the rod of the cylinder 71, poisoned front, backward at the first position L1. By this operation, two V-blocks 51 and 52 of the supporting section 5 to support the skewer-shaped supporting member K is lifted up to a position slightly upper than a hook of the hanger H, and therefore the skewer-shaped supporting member K supported by the hanger H is shifted to have both ends thereof supported by two V-blocks 51 and 52. In the operation (ii), the rod of the air cylinder 61 moves forward to move the V-blocks 51 and 52 in a direction of an arrow in FIG. 5 (toward the right) under this condition, thereby horizontally transporting the V-blocks 51 and 52 to the intermediate stop position T. In the operation (iii), the rod of the cylinder 71 moves forward at the intermediate stop position T to move the V-blocks 51 and 52 in a direction of an arrow in FIG. 5 (toward the lower side), thereby vertically transporting the V-blocks 51 and 52 to the intermediate stop position M. In the operation (iv), the rod of the air cylinder 62 in the second traversing section 6 moves forward to move the lifter 7 in a direction of an arrow in FIG. 5 (toward the right), thereby positioning the V-blocks 51 and 52 at a position as shown in FIG. 5 (where a horizontal position is the second position L2 on the rail of the hanger transporting line as shown in FIG. 5). In the operation (v), the rod of the cylinder 72 in the lifter 7 moves forward to move the V-blocks 51 and 52 in a direction of an arrow (toward the lower side of FIG. 5), thereby vertically transporting the V-blocks 51 and 52 to the lower ends of FIG. 5.

When reaching the condition of the operation (v), the supporting section 5 for the skewer-shaped supporting member K is located at the low ends thereof and the skewer-shaped supporting member K is in a position for setting the shoe bodies S.

Thereafter, the second V-block 52, having a chuck function at an opposite side of the separator side of the supporting section 5, provides a single side support for the skewer-shaped supporting member K. As already described above, the first V-block 51 at the separator side is in a waiting condition as being descended in order to avoid the interference with the separated and aligned shoe body S as moving on the shoe-guiding rail 37.

Upon completing the separation and alignment of a predetermined number of the shoe bodies S, the air cylinder 41 of the first traversing section 4 moves the predetermined number of shoe bodies S in the clearance Cw of the separator 31 on the shoe-guiding rail 37, and the respective hanging holes B of the shoe bodies S can freely be penetrated through with the skewer-shaped supporting member K. Upon completing the free penetration of the skewer-shaped supporting member K though the predetermined number of the shoe bodies S, the first V-block 51 at a separator side of the supporting section 5 for the skewer-shaped supporting member K ascends by the cylinder 54 while the chuck 52a of the second V-block 52 at an opposite side of the separator is opened, so that both sides of the skewer-shaped supporting member K are simply supported by the V-blocks 51 and 52 from below.

Then, in the operation (vi), the supporting section 5 for the skewer-shaped supporting member K moves to an upper end by the operation of the cylinders 71 and 72 of the lifter 7 and waits thereat. In the operation (vii), the hanger H, from which the skewer-shaped supporting member K was previously removed, as moving in a direction of an arrow, comes to a position properly engaging with the waiting skewer-shaped supporting member K, the rod of the cylinder 71 moves forward.

Accordingly, the skewer-shaped supporting member K supported on the predetermined number of the shoe bodies S is hung on the hanger H. The hanger H setting the predetermined number of shoe bodies S thereon via the skewer-shaped supporting member K, for example, is transported in the surface treatment equipment 300 as described in the process appeared in FIG. 7, and the surface treatment is performed on the respective shoe body S. After the hanger H exits from the surface treatment equipment 300, the shoe body S is automatically taken-out.

That is, first, the skewer-shaped supporting member K, which exits from the surface treatment equipment 300 of FIG. 7 while maintaining the penetration of the shoe bodies S, is removed from the hanger H at the second position L2 on the rail of the transporting line and is transported onto two V-blocks 51 and 52 of the supporting section 5 due to the operation of the lifter 7 and the second traversing section 6. This is an operation of the removing section to remove the skewer-shaped supporting member on which the shoe bodies are supported. Next, the skewer-shaped supporting member K supported at the supporting section 5 is transported onto the shoe-guiding rail 37 of the supporting section 5 and is transported to an end (outlet side) of the shoe-guiding rail 37 due to the effect of the first traversing section 4 moving forward and backward, and the skewer-shaped supporting member K freely penetrating through the hanging hole B of the shoe web W of the shoe bodies S is removed at the same time. This is an operation of the separating section to separate the skewer-shaped supporting member and the shoe bodies. Due to a combined operation of removing section and the separating section, the shoe bodies S are automatically taken-out and then to be joined and aligned for the next manufacturing process. The emptied skewer-shaped supporting member K after taking-out the shoe bodies S is returned to the hanger H, and therefore emptied skewer-shaped supporting member K is hung on the hanger H, thereby accomplishing the above-described automatic setting apparatus 100 for the shoe bodies S.

As mutually, continuously performing the above-explained automatic setting operation for the shoe bodies, plural shoe bodies S can automatically be hung on the hanger H.

This invention employs the following methods:

(A) the method for feeding one by one plural work-pieces, such as shoe bodies, which have been joined and aligned, with the shutter;

(B) the method for separating and aligning the plural work-pieces with the separator; and (C) the method for supporting the plural separated and aligned work-pieces with the skewer-shape supporting member, which has been freely penetrating through the work-pieces and supporting the work-pieces, and (D) the method for setting the skewer-shaped supporting member on the hanger, thereby enabling the automatic setting of the plural work-pieces on the hanger, thereby receiving the following advantages.

(A) Stock reduction, rationalization of distribution and the labor and power saving, in the manufacturing process, are realized.

(B) No scratches and dents occur when setting a work-piece on the hanger, thereby improving the yield rate.

(C) No skin oil or glove fiber remains on the surface of the work-piece because that the operators do not directly touch the work-piece when setting the work-piece on the hanger, thereby improving the quality of the surface after surface treatment of the work-piece.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Here, there may be obvious modifications to the embodiment described above. Accordingly, reference should be made to the following claims in determining the full scope of the invention.

I claim:

1. An automatic work-piece setting method comprising steps of:

separating and aligning plural work-pieces, which have been joined and aligned;

supporting said plural work-pieces, which have been separated and aligned at said separating and aligning step, with a skewer-shaped supporting member while maintaining a separated and aligned configuration of said plural work-pieces; and hanging said skewer-shaped supporting member, which has been supporting said work-pieces in the separated and aligned configuration at said supporting step, on a hanger so as to transport said plural work-pieces to a next manufacturing process, wherein said step of separating and aligning plural work-pieces comprising sub-steps of:

feeding said plural work-pieces one by one, which have been joined and aligned, by two shutters having a function of moving forward and backward; and aligning said work-pieces, which have been fed one by one at said feeding sub-step, into a predetermined number of pieces with a separating section having two mechanisms which relatively move forward and backward in an orthogonal direction.

2. The automatic work-piece setting method according to claim 1, wherein said work-pieces are shoe bodies of brake shoes for drum brakes.

3. The automatic work-piece setting method according to claim 2, wherein said shoe bodies are transported to a surface treatment process with said hanger.

4. The automatic work-piece setting method according to claim 3, wherein said work-piece has a hanging section at which to be hung on said skewer-shaped supporting member; and said supporting member have a receiving section which supports said hanging section of the work-piece.

5. The automatic work-piece setting method according to claim 4, wherein said hanging section of the work-piece is a hanging hole; and said receiving section of the skewer-shaped supporting member is a concave portion.

6. The automatic work-piece setting method according to claim 5, wherein one end of said skewer-shaped supporting member is fixed by a chuck when said supporting member freely penetrates said hanging holes of plural work-pieces.

7. The automatic work-piece setting method according to claim 2, wherein said work-piece has a hanging section at which to be hung on said skewer-shaped supporting member; and said supporting member has a receiving section which supports said hanging section of the work-piece.

8. The automatic work-piece setting method according to claim 7, wherein said hanging section of the work-piece is a hanging hole; and said receiving section of the skewer-shaped supporting member is a concave portion.

9. The automatic work-piece setting method according to claim 8, wherein one end of said skewer-shaped supporting member is fixed by a chuck when said supporting member freely penetrates said hanging holes of plural work-pieces.

10. The automatic work-piece setting method according to claim 1, wherein said work-piece has a hanging section at which to be hung on said skewer-shaped supporting member; and said supporting member have a receiving section which supports said hanging section of the work-piece.

11. The automatic work-piece setting method according to claim 10, wherein said hanging section of the work-piece is a hanging hole; and said receiving section of the skewer-shaped supporting member is a concave portion.

12. The automatic work-piece setting method according to claim 11, wherein one end of said skewer-shaped supporting member is fixed by a chuck when said supporting member freely penetrates said hanging holes of plural work-pieces.

* * * * *

UNITED STATES PATENT AND TRADEMARK OFFICE
CERTIFICATE OF CORRECTION

PATENT NO. : 7,640,645 B2  Page 1 of 1
APPLICATION NO. : 11/463235
DATED : January 5, 2010
INVENTOR(S) : Mitsutoshi Kurata It is certified that error appears in the above-identified patent and that said Letters Patent is hereby corrected as shown below:

On title page Item (54) and col. 1 line 1 delete and insert:

--AUTOMATIC WORK-PIECE SETTING AND TAKING-OUT METHOD AND AUTOMATIC WORK-PIECE SETTING AND TAKING-OUT APPARATUS USING THAT METHOD-- instead of "AUTOMATIC WORK-PIECE SETTING METHOD".

Signed and Sealed this

Ninth Day of November, 2010

David J. Kappos
*Director of the United States Patent and Trademark Office*